United States Patent
Abraham

(10) Patent No.: US 11,088,638 B2
(45) Date of Patent: Aug. 10, 2021

(54) METHOD FOR REDUCING THE COGGING TORQUE PRODUCED BY BRUSHLESS ELECTRIC MOTORS USED SIMULTANEOUSLY

(71) Applicant: CIRCOR INDUSTRIA, Le Plessis Trevise (FR)

(72) Inventor: Sylvain Abraham, Angers (FR)

( * ) Notice: Subject to any disclaimer, the term of this patent is extended or adjusted under 35 U.S.C. 154(b) by 0 days.

(21) Appl. No.: 16/674,141

(22) Filed: Nov. 5, 2019

(65) Prior Publication Data
US 2020/0153367 A1    May 14, 2020

(30) Foreign Application Priority Data
Nov. 9, 2018  (FR) ...................................... 1860391

(51) Int. Cl.
*H02K 7/14*   (2006.01)
*H02P 6/10*   (2006.01)
*H02K 21/12*  (2006.01)

(52) U.S. Cl.
CPC ............... *H02P 6/10* (2013.01); *H02K 21/12* (2013.01)

(58) Field of Classification Search
CPC ............. H02P 6/10; H02K 21/12; H02K 7/14
See application file for complete search history.

(56) References Cited

U.S. PATENT DOCUMENTS

| | | | |
|---|---|---|---|
| 2013/0328429 A1* | 12/2013 | Enomoto | H02K 16/00 310/114 |
| 2015/0375824 A1* | 12/2015 | Li | H02K 7/14 310/68 R |

* cited by examiner

*Primary Examiner* — Cortez M Cook

(57) ABSTRACT

A method for reducing a cogging torque produced by at least two brushless electric motors used simultaneously includes determining a period of the cogging torque for each of the two brushless electric motors and putting the period for each motor into phase opposition. Each of the brushless electric motors may include a rotor connected to an output shaft and a stator. The rotor may include at least one permanent magnet, and the stator may have at least two receiving volumes for at least three coils generating a magnetic field.

5 Claims, 2 Drawing Sheets

METHOD FOR REDUCING THE COGGING TORQUE PRODUCED BY BRUSHLESS ELECTRIC MOTORS USED SIMULTANEOUSLY

CROSS-REFERENCE TO RELATED APPLICATIONS

This application claims priority to French patent application no. 1860391, filed on Nov. 9, 2018, a certified copy of which has been submitted.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Field of the Invention

This invention relates to a method for reducing the cogging torque produced by brushless electric motors used simultaneously. Such a torque is also referred to, more generally, by the term cogging torque. For ease of reading, the term "cogging torque" will be preferably used hereinafter.

Description of Related Art

A brushless permanent magnet electric motor is commonly referred to as a "brushless motor". Such a motor comprises a rotor, composed of at least one permanent magnet, and a stator comprising a number of cons generating a magnetic field. The coils are powered sequentially. In this way, a magnetic field is generated that rotates at the same frequency as the power supply voltages. The permanent magnet(s) of the rotor seek at all times to be in the direction of the magnetic field, which causes the rotational movement of the rotor. The power supply voltages are constantly adapted so that the field remains ahead of the position of the rotor, in order to obtain a motor torque. It should be noted that an electric motor converts electrical energy into mechanical energy.

Some brushless motors are configured with the rotor positioned around the stator. This configuration enables high motor torque to be obtained with a relatively low rotation frequency.

Other types of brushless motor, which are more common, have a mirror configuration, i.e. a rotor inserted into the stator. In this case, the rotation speeds are higher for a lower torque, with an equivalent-sized motor. Rotor-in-stator brushless motors are used in some fields where a torque must be provided in a limited space, with safe and continuous operation. Many hydraulic systems are therefore replaced by electromechanical systems, in all fields of industry. In particular, they are encountered in the medical, space and aeronautical fields to operate electromechanical actuators.

In this context, it is increasingly common to use at least two brushless motors simultaneously to actuate the same device. Such a configuration is encountered, for example, for reasons of reliability, maintenance, safety or for reasons of power in a contained space.

Such coupling of motors is encountered, for example, in the aeronautical and space fields where, for mainly safety reasons, there is a redundancy of devices. When brushless motors are coupled, said motors, the number of which is greater than or equal to two, act on the same component, generally a rotating shaft, a worm gear or any other known component.

Hereinafter, for the ease of reading, the invention will be described for a brushless motor with the rotor inserted into the stator, it being understood that the invention is also applicable in the mirror configuration, i.e. with a rotor surrounding the stator. In this configuration, the stator forms a circular-based hollow cylinder with a central volume that receives the rotor, which is also in the shape of a solid, circular-based cylinder. The rotor comprises a drive shaft for driving a specified component. Radial partitions extend between the central volume of the stator, in the direction of the rotor. The partitions together determine the unit volumes or slots. De facto, these slots surround the rotor when said rotor is introduced into the central volume of the stator. Thus, in a radial section, the stator is a star shape or, more precisely, a star-shaped ring.

The operation of the brushless motors, regardless of their configuration with the rotor inserted into or surrounding the stator, generates, a specific torque, in this case a torque commonly referred to by the term cogging torque. According to a definition that has been accepted by the International Electrotechnical Commission (IEC), the torque referred to by the term "cogging" is the cyclic torque of a permanent magnet electric motor resulting from the tendency of the rotor and the stator to align themselves in a position of minimum magnetic reluctance.

In other words, it is the phenomenon of stepped rotation resistance or cogging torque that is observed when the rotor rotates relative to the stator, in all types of electric motor. Indeed, when the magnets are in front of a protruding metal part, the magnetic connection between the magnets of the rotor and the stator is no longer constant. This results in repulsion or attraction between the rotor and the stator.

In some fields, such a phenomenon can at least cause hindrance for the user of a piece of apparatus or device operated by such a motor. By way of a non-exhaustive example, this is the case in the aeronautical field where permanent magnet electric motors are used to maneuver the flight controls. Any hindrance or resistance that a pilot feels when handling a flight control can affect the control of the aircraft. In other words, smooth and continuous maneuverability, without resistance, of the flight controls needs to be maintained, it being understood that any resistance may be interpreted by the pilot as a problem with a flight component. But when at least two motors of this type are used simultaneously to actuate the same control, which is common in the aeronautical field for maneuvering such sensitive and essential components as flight controls, the phenomenon of cogging is heightened since each motor generates a cogging torque.

In order to remedy this cogging phenomenon, one of the known and frequently used solutions is to achieve continuity, or quasi-continuity, of the ferromagnetic material in front of the magnets, hence canceling, or at least decreasing, the resistance to the rotation of the rotor. For example, solutions with closed rotor slots and/or slots of varyingly complex shape, and/or walls with complex shapes and/or stator partitions that are positioned offset relative to the magnetic poles are known from documents US-A-2018020923, US-A-2018019648, U.S. Pat. No. 6,784,582, US-A-2005067913, US-A-2007273234, WO-A-2018008328. These solutions aim to reduce cogging torque as much as possible. Also known from US-A-2018/109166 are electric machines comprising sets of disks with magnets mounted coaxially around a rotating shaft. Interface and control modules make it possible to control the operation of the sets and thus to influence the cogging torque. Such a solution is complex and for a very specific technical field, and is hence unsuitable for existing electric motors.

More generally, all the known solutions aim to structurally modify a brushless motor. When a number of brushless motors are used, this de facto entails using modified motors, i.e. motors not available among the standardized commercial motors, which results in additional cost. Moreover, although the known solutions reduce the cogging effect, the residual effect is even greater when a large number of motors are present. In addition, the known solutions affect the performance of the motors.

It is these disadvantages that the invention more particularly intends to overcome by providing a method for reducing the cogging produced by electric motors used simultaneously, for easy and simple operation while also not affecting the structure of the motors.

BRIEF SUMMARY OF THE INVENTION

For this purpose, the invention relates to a method for reducing the cogging produced by at least two brushless electric motors used simultaneously, said motors comprising a rotor connected to an output shaft and composed of at least one permanent magnet, and a stator comprising at least two receiving volumes for at least three coils generating a magnetic field, characterized in that it comprises at least the following steps:

a) determining the period T of the cogging torque for each motor, b) putting into phase opposition the periods T of each motor determined in step a).

In this case, the cogging torques of each motor are opposed and therefore cancel each other out or, at the very least, the resultant cogging torque of each motor is greatly reduced. Such a solution does not affect the internal structure of the motors, which can also be initially installed. This solution applies to both new and existing motors and does not require the implementation of additional components. There is therefore no change in the initial overall dimensions and/or location of the motors.

According to advantageous but non-mandatory aspects of the invention, such a method can comprise one or more of the following steps:

During step a), the period T is determined by the relationship $T=360°/Na$, where $Na=Np\times Ns$ (GCD Np, Ns), Na being the number of alignments for each magnetic pole Np of the rotor with each receiving volume Ns of the stator.

During step b), the phase opposition is achieved by phase shifting the periods T of each motor by a value of (T/2).

During step b), the phase shift is achieved by offsetting the teeth on the output shaft of the motors relative to each other.

The number of motors in phase opposition is even.

Said method is associated with another solution for reducing cogging torque.

BRIEF DESCRIPTION OF THE SEVERAL VIEWS OF THE DRAWINGS

The invention will be better understood, and further advantages thereof will become more clearly apparent, upon reading the following description of a number of embodiments of the invention, provided by way of a non-exhaustive example and with reference to the accompanying drawings, in which.

DETAILED DESCRIPTION OF THE INVENTION

Figure 1:
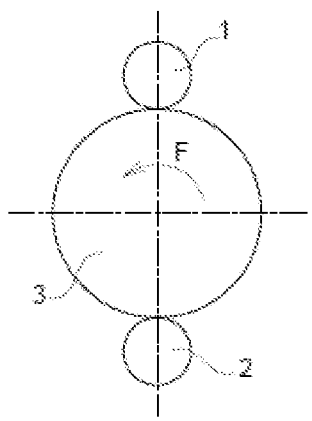
FIG. 1 is a perspective view of two brushless motors assembled on the same component, according to one embodiment of the invention.

FIG. 1 illustrates, schematically, an example of simultaneous use of two brushless motors 1, 2. Each motor 1, 2 is engaged, in this case directly, by its rotor with a rotating shaft 3 or a gear in a device known per se. In an advantageous embodiment, the motors 1, 2 are identical. Alternatively, they are not identical. The number of brushless motors can be greater than two, for example four, six or more, provided that, within the context of the invention, the number of motors is even. Similarly, the motors 1, 2 can be arranged as illustrated or in series, i.e. one behind the other on the shaft 3.

Regarding the relative position of the motors in relation to the rotating shaft, it is the same when the number of motors is greater than two. In all cases, it is understood that the direction of rotation, in this case represented by the arrow F, is identical for all the motors, this in view of the fact that the direction of rotation of the motors can be reversed.

Each motor 1, 2 generates a cogging torque. As can be seen from FIGS. 3A and 3B, the cogging effect occurs every time a magnetic pole, north or south, of the rotor is in front of a saliency of the ferromagnetic material on the stator, whether the rotor is inserted into or surrounds the stator. It should be borne in mind that the electromagnetic field propagates along the path wherein the distance to be covered in the air, which is an electromagnetic insulator, is as short as possible.

Figure 3A:
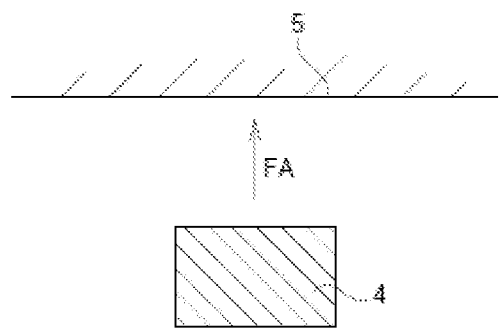
Figure 3B:
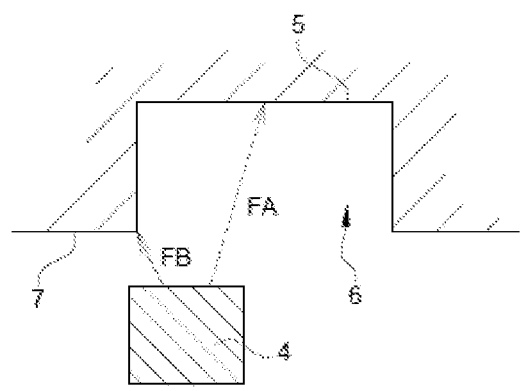

In FIG. 3A, a magnet 4 of the rotor is positioned in front of a metal part 5 without constituent saliency of the stator. In this case, the force of attraction, according to the arrow FA, of the magnet 4 on the metal part 5 is constant and smooth, regardless of the angle of rotation of the rotor. In FIG. 3B, the magnet 4 is in front of a saliency 7 due to the presence of a slot 6. In this case, the force of attraction, according to the arrow FA, of the magnet 4 on the metal part 5 is no longer constant and smooth, regardless of the angle of rotation of the rotor. As indicated previously, the electromagnetic field propagates along the path wherein the distance to be covered in the air, which is an electromagnetic insulator, is as short as possible, i.e. in this case following the arrow FB.

Figure 2:
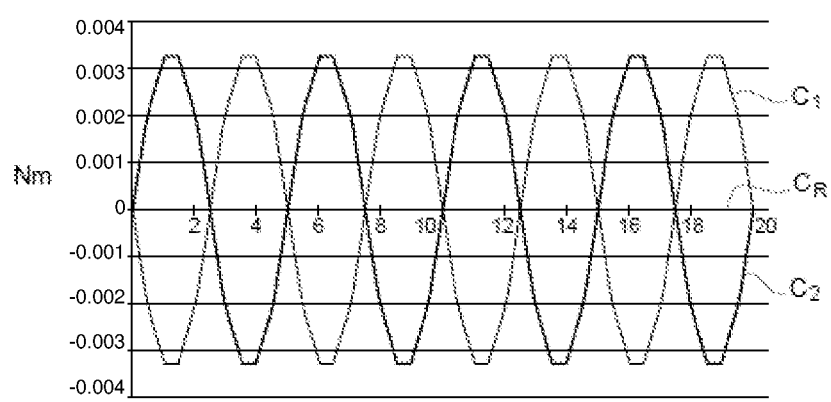
FIG. 2 is a simplified curve, on another scale, illustrating the implementation of the method according to one embodiment of the invention applied to the motors in FIG. 1 and FIGS. 3A and 3B are simplified diagrams illustrating, respectively, the absence and the presence of a cogging torque.

As is apparent from FIG. 2, each motor 1, 2 has a cogging torque C1, C2 for a given period T. According to the invention, if the periods T of the cogging torques C1, C2 of the motors 1, 2, expressed in Newtons as a function of the angular position of the rotor, are in phase opposition, the resulting torque Cr, which is zero, is observed.

For a given motor 1, 2, it is understood that, during a complete turn of the rotor, each magnetic pole of the rotor magnets is aligned once with each ferromagnetic part provided on the stator and materialized by the slots. In other words, knowing the number of alignments Na per turn, hence per complete turn of the rotor, for each motor enables the cogging torque to be characterized.

Thus, in function of the number of magnetic poles Np and in function of the number of slots Ns, it is possible to determine the number of alignments per turn Na for each motor. It should be borne in mind that a number of poles can be aligned simultaneously with a slot. In this case, the number of alignments per turn Na is given by the relationship:

$$Na = Np \times Ns/GCD(Ns;Np) \text{ where:}$$

Np: number of poles;
Ns: number of slots;
GCD: Greatest Common Divisor between Ns and Np.

From this number of alignments Na, it is then possible to determine a period T of the cogging torque for each motor 1, 2 via the relationship:

$$T = 360°/Na$$

Each motor 1, 2 therefore has a cogging torque for a period T determined by the previously specified relationship.

According to the invention, if the periods T of the cogging torques for the motors 1, 2 are shifted by a given value, in this case, when there are two motors, a phase shift value D equal to one half period, i.e. D=T/2, then, for identical motors 1, 2, opposing values are obtained for the cogging torques. It is understood that with a number of motors greater than two but even, the value of the phase shift is adapted to the cogging profile. Indeed, the cogging curve is not a perfect sinusoid. Moreover, the cogging profiles between the motors may be different if said motors are not identical but have an identical period.

Thanks to the invention, it is therefore easy, when there are two or an even number greater than two, of identical brushless motors, or at least with an identical period T when the motors are not the same, to reduce or even eliminate the cogging effect.

The invention thus has applications both on assemblies with new motors and on existing assemblies. In addition, no structural modification of the motors is necessary, except to optimize the positioning of the rotor relative to the rotating shaft of each motor.

The phase shift is achieved for each motor, for example, by indexing the teeth on the rotor gear relative to a given fixed point of the stator for the motors 1, 2. Thus, by a purely mechanical adjustment, without adding any component and without changing the overall dimensions and/or location of the motors, cogging is definitively canceled for the assembly of motors concerned.

It is understood that, depending on the motors, the size of the cogging torques varies and therefore, de facto, that the phase shift to be achieved must vary in size. For this purpose, it is possible, but not mandatory, to couple the invention with another technical solution enabling the cogging effect to be minimized as much as possible.

The invention claimed is:

1. A method for reducing a cogging torque produced by at least two brushless electric motors used simultaneously and together, comprising:
    a) determining a period T of the cogging torque for each said at least two brushless electric motors, the period T determined by a relationship T=360°/Na, where Na=Np×Ns/GCD, Na being a number of alignments, Np being a number of magnetic poles, Ns being a number of slots, and GCD being a greatest common divisor between Ns and Np, and
    b) putting each said period T into a phase opposition,
    wherein the period T has an identical value for each said brushless electric motor of said at least said two brushless electric motors,
    wherein said at least two brushless electric motors comprise an even number of brushless electric motors,
    wherein each said at least two brushless electric motors may or may not be identical, and
    wherein no structural modification of said at least two brushless electric motors is necessary to reduce the cogging torque.

2. The method according to claim 1, wherein, during step b), the phase opposition is achieved by phase shifting the period T of each said at least said two brushless electric motors by a value of (T/2).

3. The method according to claim 2, wherein, during step b), the phase shifting is achieved by offsetting teeth on an output shaft of the at least two brushless electric motors relative to each other.

4. A method for reducing a cogging torque produced by at least two brushless electric motors used simultaneously, comprising:
    a) determining a period T of the cogging torque for each said at least two brushless electric motors, the period T determined by a relationship T=360°/Na, where Na=Np×Ns/GCD, Na being a number of alignments, Np being a number of magnetic poles, Ns being a number of slots, and GCD being a greatest common divisor between Ns and Np, and
    b) putting each said period T into a phase opposition,
    wherein the period T has an identical value for each said brushless electric motor of said at least said two brushless electric motors,
    wherein said at least two brushless electric motors comprise two or more different brushless electric motors, and
    wherein said at least two brushless electric motors comprise an even number of brushless electric motors.

5. A method for reducing a cogging torque produced by at least two brushless electric motors used simultaneously, comprising:
    a) determining a period T of the cogging torque for each said at least two brushless electric motors, the period T determined by a relationship T=360°/Na, where Na=Np×Ns/GCD, Na being a number of alignments, Np being a number of magnetic poles, Ns being a number of slots, and GCD being a greatest common divisor between Ns and Np, and b) putting each said period T into a phase opposition,
wherein the period T has an identical value for each said brushless electric motor of said at least said two brushless electric motors,
wherein said at least two brushless electric motors are oriented laterally with a rotating shaft disposed there between, and
wherein said at least two brushless electric motors comprise an even number of brushless electric motors.

\* \* \* \* \*